US006694622B2

(12) United States Patent
Kim

(10) Patent No.: US 6,694,622 B2
(45) Date of Patent: Feb. 24, 2004

(54) COMBINATION MEASURING, MARKING AND CUTTING TOOL

(76) Inventor: James W. Kim, 5129 Powers Ferry Rd., Atlanta, GA (US) 30327

( * ) Notice: Subject to any disclaimer, the term of this patent is extended or adjusted under 35 U.S.C. 154(b) by 51 days.

(21) Appl. No.: 10/162,147

(22) Filed: Jun. 4, 2002

(65) Prior Publication Data

US 2003/0221322 A1 Dec. 4, 2003

(51) Int. Cl.[7] .................................................. G01B 3/10
(52) U.S. Cl. .............................. 30/293; 33/760; 33/770
(58) Field of Search ................................. 33/32.3, 32.2, 33/220, 255, 760; 30/293, 233, 383; 83/745; 7/164

(56) References Cited

U.S. PATENT DOCUMENTS

| | | | | |
|---|---|---|---|---|
| 1,855,651 A | * | 4/1932 | Roberson | 33/760 |
| 5,782,007 A | * | 7/1998 | Harris | 33/770 |
| 6,442,860 B1 | * | 9/2002 | Williams et al. | 33/770 |
| 2003/0000099 A1 | * | 1/2003 | Wang | 33/760 |

* cited by examiner

*Primary Examiner*—Douglas D. Watts
(74) *Attorney, Agent, or Firm*—Rodgers & Rodgers

(57) ABSTRACT

A combination measuring, marking and cutting tool comprising a housing, a measuring tape extendable from the housing, a ferrule attached to the free end of the measuring tape, an aperture formed in the ferrule, and a T-shaped pivot tab secured to the housing in proximity to the measuring tape.

8 Claims, 2 Drawing Sheets

COMBINATION MEASURING, MARKING AND CUTTING TOOL

BACKGROUND OF THE INVENTION

In the construction industry, there is a recurring need for measuring, marking and cutting tools for use in connection with planar materials such as plasterboard. In practice, there are individual tools available which accomplish the various tasks required to mark, cut and finish a sheet of material. The problem lies in the fact that the requirement to use various individual tools is cumbersome and time consuming by the user to finish the particular task at hand.

BRIEF SUMMARY OF THE INVENTION

By this invention, a combination measuring, marking and cutting tool is provided and comprises a tape measure extendible from a housing, a pivot tab extending downwardly from the housing, a ferrule secured to the end of the tape measure remote from the housing, and an aperture formed in the ferrule.

DETAILED DESCRIPTION OF THE INVENTION

Figure 1:
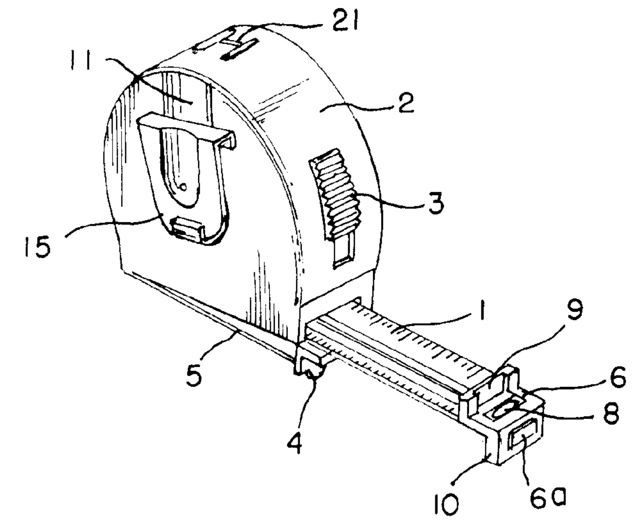
FIG. 1 is a perspective view of the combination tool according to this invention.

In the drawings and with particular reference to FIG. 1, the numeral 1 designates a conventional tape measure which is retractable into housing 2, as is well known. Thumb tab 3 allows, in one position, for the extension of tape measure 1 and, in the other position, for the stoppage of extended tape measure 1 at any desired position.

Figure 4:
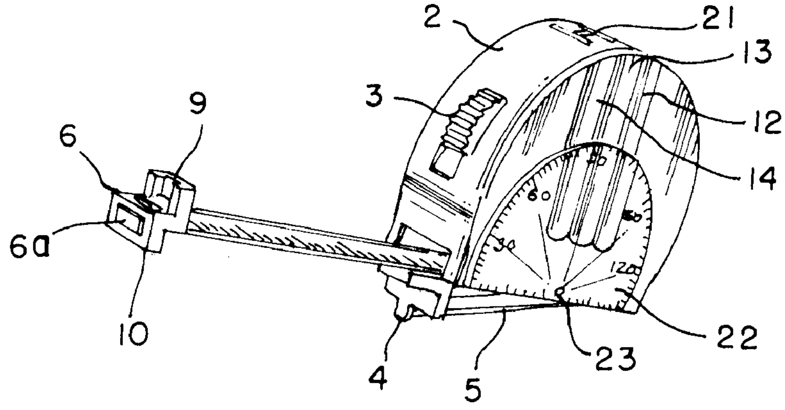
FIG. 4 is a perspective view of a modification of the tool.

According to this invention, T-shaped pivot tab 4 is secured to the lower edge of housing 2, as best shown in FIGS. 1 and 4. Leaf spring 5 is secured to the bottom wall of housing 2 remote from the T-shaped pivot tab 4, the free end of which is substantially adjacent the rounded tip of T-shaped pivot tab 4.

Figure 3:
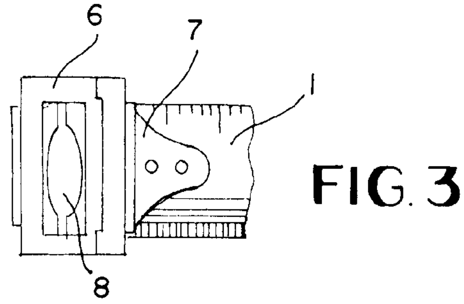
FIG. 3 is an enlarged plan view of the end of the tape measure.

Also, according to this invention, ferrule 6 is secured to the end of tape measure 1 by means of tab 7, as best shown in FIG. 3, and aperture 8 is formed in ferrule 6. Further, wall 9 extends upwardly from one side of ferrule 6 and wall 10 extends downwardly from the opposite side of ferrule 6. Ferrule 6 can be magnetized, as desired, such as by means of attaching magnet 6*a* to wall 10.

For ease of use, thumb indentation 11 is formed on one side of the housing 2 and finger indentations 12, 13 and 14 are formed on the opposite side of housing 2. Also, belt chip 15 is provided for the purpose of storage on the user's belt.

Figure 2:
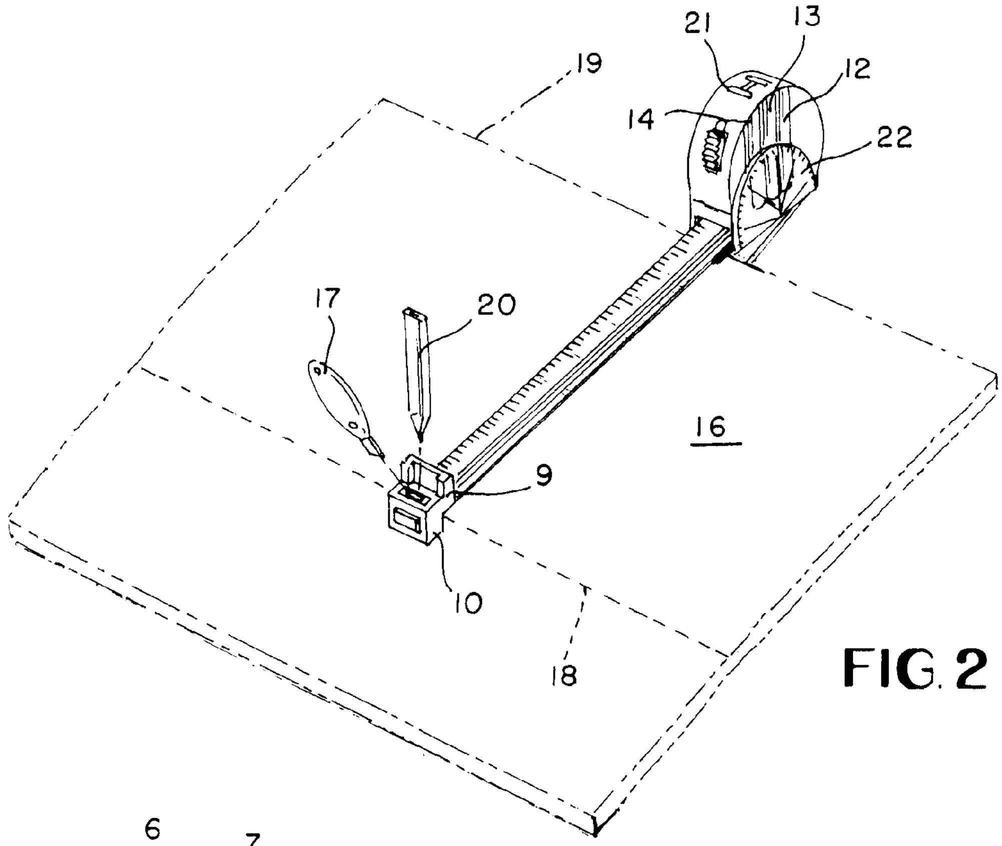
FIG. 2 is a perspective view showing use of the combination tool in connection with plasterboard.

In operation, when using plasterboard in the construction typically of walls and ceilings, it is essential that a perfectly straight edge be achieved in order to provide uniform joints between adjacent sheets of board such that the seams are virtually invisible in the finished wall or ceiling. In order to achieve this result by means of applicant's invention, plasterboard is first rough cut to the required dimensions as shown in FIG. 2 whereby housing 2 is positioned such that T-shaped pivot tab 4 is disposed in abutting relationship with one edge of plasterboard 16. Then tape measure 1 is extended outwardly to the desired length and knife 17 is inserted through aperture 8 and then maneuvered to cut the plasterboard along edge 18. Following this wall 10 is positioned to overlap edge 18 of plasterboard 16. Then knife 17 is inserted through aperture 8 and the entire device is simply caused to slide along opposite edges 18 and 19 of plasterboard 16 so that knife 17 provides a perfectly straight cut along edge 18.

If it is desired to measure or mark a circle on plasterboard 16, housing 2 is placed on top of plasterboard 16 whereby rounded pivot tab 4 is placed on the desired point of pivot. Then pencil 20 is inserted through aperture 8 and ferrule 6 is rotated in a circle around pivot tab 4 which results in the marking of a perfectly round circle shape. Leaf spring 5 is provided in order to prevent debris from accumulating around T-shaped pivot tab 4.

Figure 5:
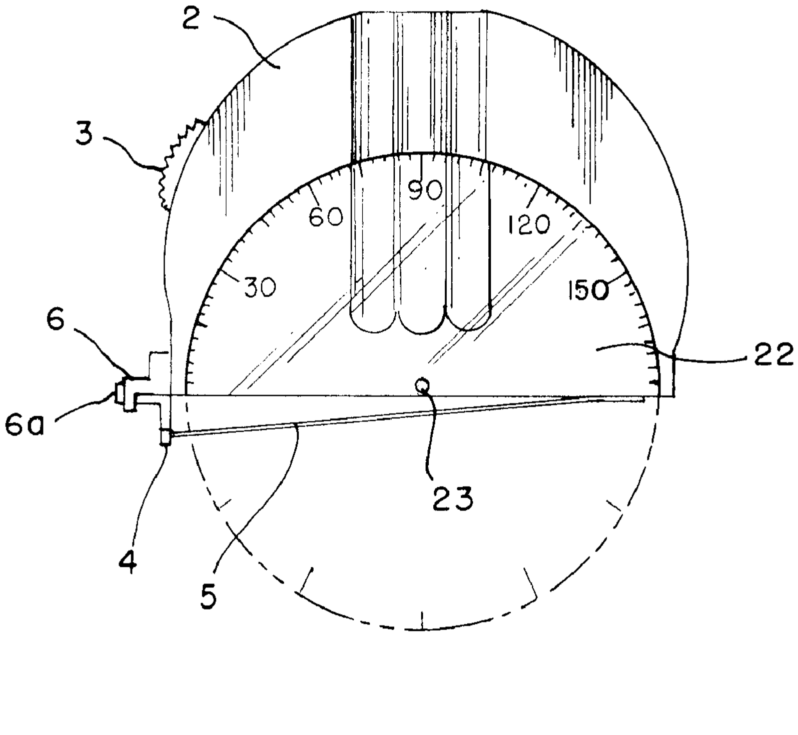
FIG. 5 is an enlarged elevational view of the modified version of the invention shown in FIG. 4.

A modification of the invention is shown in FIGS. 4 and 5 wherein H-shaped water level 21 is secured to the upper curved surface of the housing 2. In addition, protractor 22 is rotatably affixed to one side of housing 4 by means of pivot pin 23. Therefore, when it is desired to make a level determination, housing 2 is placed on a planar surface with T-shaped tab 4 overlapping adjacent the edge thereof and with leaf spring 5 compressed into a flat planar relationship with the lower surface of housing 2. By this means, an accurate level reading can be made.

When it is desired to make an angle determination, protractor 22 is simply swung out of a position in flat face contacting relationship with the side wall of housing 2 and into the position shown in FIG. 5. The outwardly extending portion of protractor 22 is then simply positioned on an appropriate planar surface in order to make the required angle determination.

Therefore, by this invention, a combination tool is provided whereby sharp and precise cuts can be made to the edges of a planar sheet of construction material such as plasterboard. In addition, perfectly round circles can be drawn on the surface of the material with level and angular determinations achieved as desired.

I claim:

1. A combination measuring, marking and cutting tool comprising a housing, a tape measure extendible therefrom, a ferrule adjoined to the end of said tape measure remote from said housing, an aperture formed in said ferrule, and said housing comprising a bottom wall, and a pivot tab secured to said bottom wall adjacent said measuring tape.

2. A combination tool according to claim 1 wherein said ferrule comprises a first wall extending upwardly therefrom and a second wall extending downwardly therefrom.

3. A combination tool according to claim 1 wherein said housing comprises an upper surface and a water level is secured to said supper surface.

4. A combination tool according to claim 1 wherein said housing comprises a pair of spaced side walls and a protractor is rotatably secured to one of said side walls and disposed in face contacting relation with said one side wall when in a storage condition.

5. A combination tool according to claim 1 wherein the free end of said pivot tab is rounded.

6. A combination tool according to claim 1 wherein a leaf spring is secured to said bottom wall remote from said pivot tab.

7. A combination tool according to claim 1 wherein said ferrule is magnetized.

8. A combination tool according to claim 1 wherein said pivot tab is T-shaped.

* * * * *